United States Patent [19]

Dudding

[11] Patent Number: 4,951,724
[45] Date of Patent: Aug. 28, 1990

[54] COUPLING DEVICE

[75] Inventor: Sheron L. Dudding, Brough, England

[73] Assignee: International Ferry Freight Limited, North Humberside, England

[21] Appl. No.: 445,905

[22] Filed: Dec. 4, 1989

Related U.S. Application Data

[63] Continuation of Ser. No. 104,787, Oct. 5, 1987, abandoned.

[30] Foreign Application Priority Data

Oct. 6, 1986 [GB] United Kingdom ............... 86/23970

[51] Int. Cl.$^5$ .............................................. B65B 1/04
[52] U.S. Cl. .................................... 141/383; 141/392; 141/311 R
[58] Field of Search .................... 141/1, 285, 290, 301, 141/309, 311 R, 312, 346, 347, 382, 383, 392

[56] References Cited

U.S. PATENT DOCUMENTS

| 2,832,378 | 4/1958 | Beavon | 141/312 X |
| 2,871,895 | 2/1959 | Rektorys | 141/309 X |
| 3,677,311 | 7/1972 | Parrish | 141/1 |

Primary Examiner—J. R. Scott
Attorney, Agent, or Firm—Pravel, Gambrell, Hewitt, Kimball & Krieger

[57] ABSTRACT

A coupling device for use in coupling the discharge outlet pipe (19) of a container to a discharge pump (14). The coupling device comprises a housing (1) defining a discharge compartment (3) which is open at the bottom and closed at the top by a diaphragm (5) having a resiliently deformable aperture (6) therein. In use, the opening at the bottom of the discharge compartment is adapted to be connected to the inlet port of the discharge pump (14) and the resiliently deformable aperture (6) in the diaphragm (5) is adapted to receive the container discharge outlet pipe (19) therein.

9 Claims, 2 Drawing Sheets

COUPLING DEVICE

This is a continuation of application Ser. No. 104,787, filed on Oct. 5, 1987, now abandoned.

FIELD OF THE INVENTION

The present invention relates to a coupling device for use in coupling the discharge outlet pipe of a shipping container or tanker to a discharge pumping device, to facilitate rapid discharge of the contents of the container or tanker. The coupling device is especially suited for use with a type of discharge pumping device called a rotary valve air seal, well known in the art, which discharges granular, particulate or powdered materials from a shipping container.

BACKGROUND

Bulk granular, particulate or powered materials are conveniently transported in containers or tankers which can be carried by road, sea or rail. Owing to the fluid nature of these materials they can be discharged from a container by the simple expedient of opening a container discharge outlet near the floor of one end of the container and raising the opposite end of the container to allow the material to flow out of the container discharge outlet under gravity. Unfortunately though, the rate at which material flows from the container under gravity is not easily controlled. Accordingly, it is common practice to connect a rotary valve seal to the discharge outlet of the container to assist in the discharge. By way of explanation, a rotary valve seal comprises a plurality of vanes equi-spaced about a rotatable axle to define a V-shaped vane compartment between each adjacent pair of vanes. This assembly is mounted in a housing which has a material inlet port at the top through which material can enter the uppermost vane compartment, and which has a compressed air inlet and a material discharge port at the bottom, positioned at opposite ends of the lowermost vane compartment. As the multi-vane assembly is rotated, it picks up material in the uppermost vane compartment by blowing it out through the material discharge port.

As indicated above, as the lowermost vane compartment passes between the compressed air inlet and the material discharge port, the material in the vane compartment is expelled under pressure. However, the vanes are moving relatively fast, and a volume of high pressure air will ussualy remain in each vane compartment after it is emptied, together with a residual quantity of material. If this volume of high pressure air is allowed to reach the material inlet port, it will be vented into the container discharge outlet, causing a blowback of material into the shipping container and inhibiting the passage of material into the vane compartment. Accordingly, the vane compartment must be vented before it reaches the material inlet port. To this end, a venting port is provided in the side of the housing so that each vane compartment will pass the venting port before it passes the inlet port. To prevent any residual material in the vane compartment being expelled to atmosphere, a cloth filter is provided across the venting port mouth. Unfortunately, these cloth filters are prone to leakage in the initial period of their use and eventually become clogged.

Unless the connection between the container discharge outlet and the rotary valve seal material inlet port forms a tight seal, material may leak out. This is undesirable, particularly where the material being discharged is hazardous. Of course, it is always possible to use an elaborate coupling device between the container discharge outlet and the material inlet port which prevents leakage of material, but such coupling devices are complex in construction and cannot readily be transferred from one shipping container to another. Moreover, the coupling device must be able to accommodate changes in the relative positions of the container discharge outlet and the rotary valve seal inlet port as the container is tipped to bring material toward its discharge outlet.

In order to prevent material contaminating the interior of the shipping container, making it necessary to clean the container out after each new load, it is known to provide a polyethylene liner inside the shipping container. The liner comprises a plurality of filling sleeves in the top through which the liner can be filled and a discharge sleeve at the bottom through which the liner can be emptied.

SUMMARY OF THE INVENTION

It is an object of the present invention to provide a coupling device for use in coupling the discharge outlet of a container or tanker loaded with granular, particulate or powdered material to a discharge pumping device such as a rotary valve seal in which the above-mentioned disadvantages are obviated or substantially mitigated It is a further object of the present invention to provide a shipping container liner which is especially, although not exclusively, suited for use with the coupling device of the present invention.

According to the present invention, there is provided a coupling device for use in coupling the discharge outlet of a shipping container to a discharge pumping device. having a discharge chamber which is open at the bottom and closed at the top by a diaphragm. The diaphragm has a reisliently deformable aperture into which the container discharge outlet fits tightly. In use, the open bottom of the discharge chamber is connected directly to the material inlet port of a discharge pumping device such as a rotary valve seal, and the resiliently deformable aperture in the diaphragm is sized to fit tightly on the container discharge outlet.

Preferably, the coupling device also has a venting chamber which is connected to a high pressure air vent in the discharge pumping device and which has an opening to atmosphere.

In use, the coupling device of the present invention is particularly suited for use with a rotary valve seal. In a rotary valve seal, high pressure air is vented through the material inlet port as each material carrying vane compartment reaches the leading edge of the material inlet port. Accordingly, the venting chamber is open to the leading edge of the rotary valve seal material inlet port, and the discharge chamber is positioned immediately next to the venting chamber and is open to the remaining area of the material inlet port. As the high pressure air in each rotary valve seal vane compartment may be expelled through a relatively small opening, the opening to the venting chamber can be quite small and need not unduly reduce the overall size of the rotary valve seal material inlet port.

The diaphragm, which is preferably made of an elastomer such as rubber, is secured in place over the top of the discharge chamber by means of a detachable frame.

This enable a diaphragm to be easily removed and replaced when it becomes worn.

In use, when the discharge outlet of a container is received in the resiliently deformable aperture within the diaphragm, the edge of the aperture is stretched, folds inwardly, and grips the sides of the outlet to form a tight seal therewith. This seal is further enhanced by the internal pressure within the discharge chamber which tends to press the inwardly folded edge of the aperture into engagement with the sides of the outlet and prevent a blow-out from occurring. Owing to the resiliency of the diaphragm, it can easily accommodate movement of the container discharge outlet into the discharge chamber, as the container is tipped to bring material toward the outlet; yet it is a simple and relatively unsophisticated form of seal. It will be readily apparent that the outlet can easily and quickly be disengaged from the aperture in the diaphragm.

Preferably, the coupling device is secured in position over the rotary valve seal material inlet port by means of cam lock clamps which engage with a lip of the rotary valve seal housing.

Preferably, a rubber gasket is provided between the bottom of the coupling device and the sides of the rotary valve seal material inlet port to form an effective seal therebetween.

Preferably, the opening to atmosphere in the venting chamber is vented to the interior of the shipping container via a seperate connection. Preferably, a check valve is provided in the vent to the shipping container to prevent any backflow of air or material to the venting chamber. Where the material is contained within a polyethylene liner in the shipping container, the check valve can be a flap valve in the liner.

BRIEF DESCRIPTION OF THE DRAWINGS FIG.
1 shows a perspective view of a coupling device according to the present invention;

DETAILED DESCRIPTION OF THE INVENTION

Figure 1:
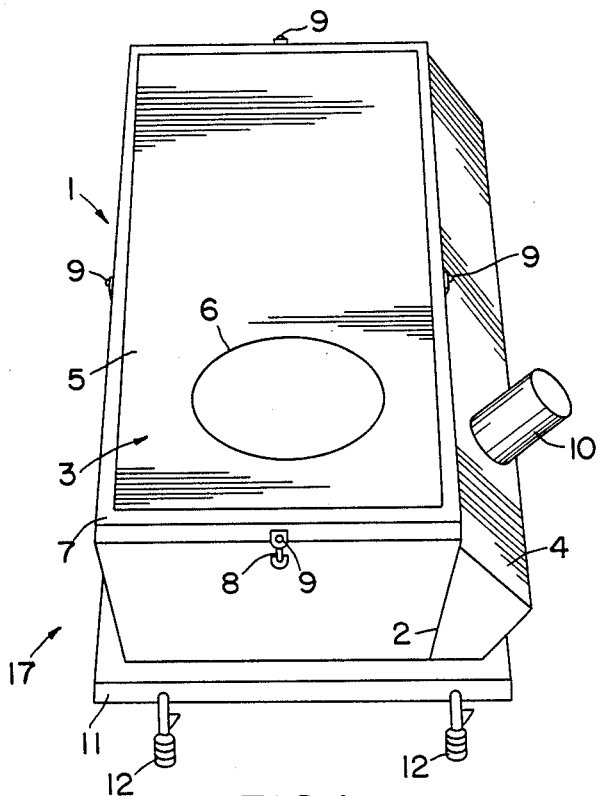
Figure 2:
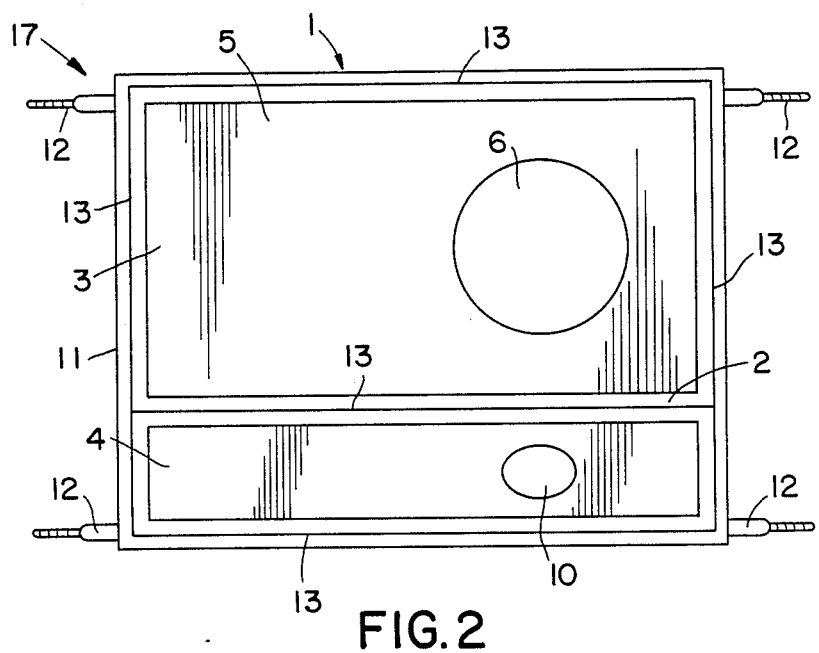
FIG. 2 shows a bottom plan view of the coupling device of FIG. 1.

Referring to FIGS. 1 and 2, the coupling device 17 has a substantially rectangular body 1 which is divided by an internal wall 2 into two separate chambers 3 and 4. The bottom of the body 1 is open. The top of the discharge chamber 3 is covered by a rubber diaphragm 5 which has an aperture 6 therein. The rubber diaphragm 5 is secured in place on the body 1 by rectangluar frame 7 which fits around the outside of the upper edge of the discharge chamber 3 and is secured in place by bolts 8 each of which passes through an adjacent pair of lugs 9 on the sides of the body 1 and the frame 7. The venting chamber 4 also has another opening in it, which is formed by vent pipe 10, as well as being open at the bottom.

Around the bottom of the body 1 is provided a body flange 11 which carries four spring loaded fasteners such as cam lock clamps 12. In use, the cam lock clamps 12 secure the body flange 11 to a corresponding seal flange 25 around the material inlet port of a rotary valve seal 14 (see FIG. 3). The material inlet port is a rectangular opening in the top of the rotary valve seal housing, congruent with the open bottom of the body 1 of the coupling device of this invention. It is divided by a bar lying directly beneath internal wall 2 in body 1. In order to ensure a good seal between body flange 11 and the seal flange 25 of the rotary valve seal 14, a bead 13 is welded around the perimeter of the body flange 11, which presses into a rubber gasket 26 positioned over the seal flange 25 of the rotary valve seal 14 when the cam lock clamps 12 are engaged. The wire bead 13 also extends along the bottom of the internal wall 2 and engages with a corresponding portion of the gasket 26 carried by a dividing bar (not shown) in the material inlet port of the rotary valve seal 14.

It will be seen from FIG. 2 that the width of the opening to venting chamber 4 is much less than that of discharge chamber 3. Venting chamber 4 vents high pressure air from the rotary valve seal 14, whilst discharge chamber 3 is the chamber through which material from a shipping container or tanker is discharged into the rotary valve seal 14. This will become more apparent when the operation of the coupling device is described with reference to FIG. 3 of the accompanying drawings.

Figure 3:
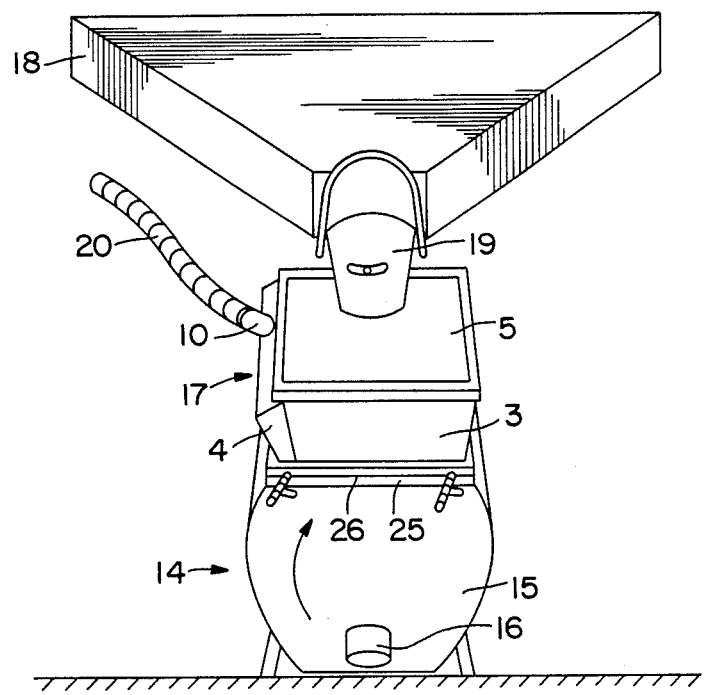
FIG. 3 shows a perspective view of the coupling device of FIG. 1 connected between the discharge outlet of a container and a rotary valve seal.

Referring now to FIG. 3 there is shown a typical rotary valve seal 14 well known in the art. Within the rotary valve seal 14 is provided a multi-vane assembly (not shown) mounted on a rotatable axle which runs axially within a housing 15. The multi-vane assembly rotates in the direction shown by the arrow. The top of the housing 15 has a rectangular opening divided by a bar (not shown) to define a high pressure air vent and a material inlet port combined. The high pressure air vent side of the opening is on the leading side of the opening in the direction of vane rotation, whilst the material inlet port is on the trailing side. At the bottom of the rotary valve seal 14 are provided a material outlet port 16 on one and and a compressed air inlet (not shown) at the other end of the housing 15, respectively. The material outlet port 16 and the compressed air inlet (not shown) are simultaneously exposed to the vane compartment defined between the lowermost pair of adjacent vanes (not shown).

Mounted over the rectangular opening in the top of the rotary valve seal housing 15 is a coupling device 17 embodying the present invention. Above the coupling device 17 is a typical tun dish 18 which is connected to the discharge outlet 19 of a container. Within the container discharge outlet 19, a flow control valve typically is provided. This free end of the container discharge 19 is received in the aperture 6 in the rubber diaphragm 5 over the top of the discharge chamber 3. The aperture 6 in rubber diaphragm 5 grips the sides of the discharge outlet 19 and forms a tight seal therewith. The vent pipe 10 from the venting chamber 4 is connected by a flexible vent hose 20 to the inside of the shipping container (not shown).

Operation of the coupling device will now be described.

In order to discharge a granular, particulate or powdered material from the shipping container, the far end of the container from the discharge outlet 19 is raised to tip the material toward the discharge outlet 19. This action also ensures that the free end of the discharge outlet 19 is brought down to the level of the rubber diaphragm 5 for insertion into the aperture 6 therein.

This insertion causes the edge of aperture 6 to roll inwardly.

Once the rotary valve seal 14 is switched on, the vanes rotate inside the housing 15 in the direction of the arrow, and the vane compartments defined between adjacent pairs of vanes pass under the material inlet port where material drops in. When a vane compartment reaches the bottom of the housing 15, it passes between the material outlet port 16 and the compressed air inlet, and material is expelled from the vane compartment through the material outlet port 16 under the action of the stream of high pressure air from the compressed air inlet. The vanes rotate relatively fast, and as a result, a volume of high pressure air will remain in the vane compartment as it passes beyond the material outlet port 16, together with a residual amount of material. If this vane compartment were to be vented back into the container discharge outlet 19, it would inhibit the ability of the vane compartment to draw in material, but before the vane compartment reaches the discharge chamber 3, it passes the venting chamber 4, allowing the high pressure air to be exhausted into the flexible vent hose 20 and back into the top of the shipping container. Any residual material in the exhausted air is also carried back into the shipping container, which avoids any possiblity of it leaking to atmosphere.

Figure 4:
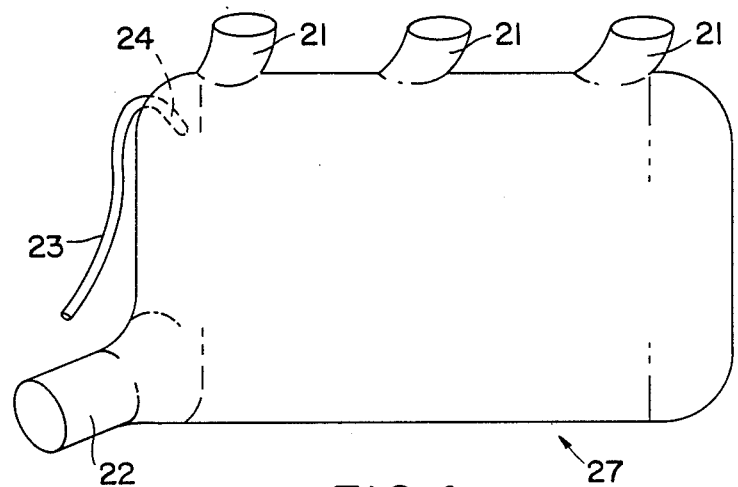
FIG. 4 shows a side elevation of a shipping container liner which is especially suited for use with the coupling device of the present invention.

Referring to FIG. 4, there is shown a modified shipping container liner 27 which is especially, although not exclusively, suited for use with a coupling device embodying the present invention. Generally, container liners are used to prevent contamination of the interior of a shipping container. This allows a shipping container to be used for different material without it being necessary to clean out the interior of the shipping container after each new load. Only the liners need to be changed. Conventional container liners have a plurality of filling sleeves at the top through which the liner can be filled with material and a discharge sleeve at the bottom through which material can be discharged. In the modified liner 27 of FIG. 4, the filling sleeves 21 and discharge sleeve 22 are at the top and bottom, respectively, of the liner. In addition, a high pressure air vent is provided, in the form of a flexible vent tube 23 of polyethylene which extends from the exterior into the interior of the liner 27. This vent tube 23 can be connected to the flexible vent hose 20 to allow high pressure air from the venting chamber 4 to be vented to the interior of the liner 27, together with any residual material the vented air carries. To prevent any back flow of material through the flexible vent tube 23, the end thereof which opens into the liner 27 is extended to define a flap valve 24. Normally, under its own weight, the flap valve 24 will hang downward closing the flexible vent tube 23 and preventing material passing out from the liner through it. However, when high pressure air is passed through the vent tube 23, as from the venting chamber 4, it will distend the flap valve 24, opening it and allowing the vented air and residual material to pass through into the liner 27.

I claim:

1. A coupling device for use in coupling a discharge outlet of a shipping container to a discharge pumping device, comprising:
    a body, having an open bottom for mounting on top of a discharge pumping device and having an open top;
    a discharge chamber, within the body, having an open bottom sized to fit a material inlet port on the discharge pumping device and open at the top;
    a resilient diaphragm closing off the top of the discharge chamber; and
    a deformable aperture, in the diaphragm, sized to fit a discharge outlet of a shipping container.

2. A coupling device according to claim 1, further comprising:
    a venting chamber, within the body, having an open bottom sized to fit a high pressure air vent on the discharge pumping device; and
    a vent opening on the venting chamber to vent to atmosphere.

3. A coupling device according to claim 2, further comprising a fitting on the vent opening for connection of a vent hose which leads to the interior of the shipping container.

4. A coupling device according to claim 3, further comprising a check valve in the vent hose which prevents back flow of air or material into the venting chamber.

5. A coupling device according to claim 2, wherein the venting chamber is positioned alongside the discharge chamber so that the ventin chamber can align with a leading edge of a material inlet port of a rotary valve seal discharging device and the discharge chamber can align with the remainder of the material inlet port of the rotary valve seal in order to vent each vane compartment in the rotary valve seal prior to filling the vane compartment with material.

6. A coupling device according to claim 1, wherein the resilient diaphragm is made of rubber.

7. A coupling device according to claim 1, further comprising a detachable frame which secures the diaphragm in place over the top of the discharge chamber.

8. A coupling device according to claim 1, further comprising a plurality of cam lock clamps mounted on the body which secure the body in position over the material inlet port of the discharge pumping device.

9. A coupling device according to claim 1, further comprising a rubber gasket between the open bottom of the body and the material inlet port of the discharge pumping device.

* * * * *